United States Patent [19]
Adams et al.

[11] Patent Number: 5,282,231
[45] Date of Patent: Jan. 25, 1994

[54] LOWER TIE PLATE CAST FRAME

[75] Inventors: Daniel L. Adams, Richland; Ryan D. Liechty; Roland J. DeSteese, both of Kennewick, all of Wash.

[73] Assignee: Siemens Power Corporation, Richland, Wash.

[21] Appl. No.: 952,926

[22] Filed: Sep. 23, 1992

[51] Int. Cl.$^5$ .................................................. G21C 1/04
[52] U.S. Cl. .................................... 376/352; 376/310; 376/313
[58] Field of Search ............... 376/352, 313, 438, 310, 376/447, 449; 976/DIG. 59

[56] References Cited

U.S. PATENT DOCUMENTS

| | | | |
|---|---|---|---|
| 3,284,315 | 11/1966 | Thorne | 176/76 |
| 3,382,153 | 5/1968 | Bigge et al. | 176/40 |
| 3,951,739 | 4/1976 | Frick et al. | 176/78 |
| 4,022,661 | 5/1977 | Smith et al. | 176/79 |
| 4,231,843 | 11/1980 | Myron et al. | 376/352 |
| 4,655,995 | 4/1987 | Freeman et al. | 376/267 |
| 5,030,412 | 7/1991 | Yates et al. | 376/352 |
| 5,071,617 | 12/1991 | Bryan et al. | 376/352 |
| 5,160,697 | 11/1992 | Verdier et al. | 376/352 |

Primary Examiner—Donald P. Walsh
Assistant Examiner—Meena Chelliah
Attorney, Agent, or Firm—Ira L. Zebrak

[57] ABSTRACT

A lower tie plate for a nuclear fuel assembly is provided via an integral casting including a frame containing a first plurality of guide tube bosses in a central portion thereof, a second plurality of guide tube bosses concentric with the first plurality of guide tube bosses, and a plurality of teardrop shaped struts connecting the first and second guide tube bosses to one another and to the frame. The guide tube bosses serve to respectively directly receive individual guide tube cap screws of guide tubes of the nuclear fuel assembly. The interior top portion of the lower tie plate is configured to receive and support a debris screen.

22 Claims, 6 Drawing Sheets

LOWER TIE PLATE CAST FRAME

FIELD OF THE INVENTION

The field of the present invention relates generally to nuclear fuel assemblies, and more particularly to tie plates for such assemblies.

BACKGROUND OF THE INVENTION

There have been many attempts in the prior art to improve upon the mechanical configuration for nuclear fuel assemblies. It is important in the design of such assemblies that premature wear of the mechanical structure due to coolant flow be minimized, and that the design is able to withstand thermal stresses. It is also important in such nuclear fuel assemblies that the flow of coolant about the fuel rods not be restricted, and that any debris within the coolant be trapped in a manner not restricting coolant flow. Even with the demanding design parameters for nuclear fuel assemblies, it is also important that the number of components associated with the structure be minimized for enhancing reliability, and reducing cost.

There are many examples of nuclear fuel assembly designs in the prior art that include some form of tie plate or tie plates within the assembly, for both supporting the fuel rods therein and providing rigidity to the structure. A number of such prior nuclear fuel assemblies are briefly described below.

Yates et al., U.S. Pat. No. 5,030,412, having the same assignee as the present invention, shows a debris screen for a nuclear fuel assembly. In FIG. 8 thereof a lower tie plate 30(30') is shown that incorporates a debris screen having a configuration as shown in FIG. 7. The debris screen is secured into a bottom portion of the tie plate 30(30'). Guide tube and instrument tube bushings must be provided separately for use in tie plate 30(30'). The present invention overcomes this disadvantage by providing integral guide tube bosses in the associated lower plate for the location of guide tube cap screws. Also, the present invention provides a lower tie plate produced from an integral casting configured for receiving a debris screen in a top portion thereof.

Bryan et al., U.S. Pat. No. 5,071,617, shows a nuclear fuel assembly that includes a cast lower end fitting 20. The end fitting 20 includes a top plate or a grid 22 configured with a plurality of rectangular through holes 24 for manifolding coolant through the fuel assembly. One centrally located hollow boss 26, and four hollow bosses 26 are included thereon at individual corners thereof, for receiving guide tubes 30(30'). Also, at opposing corners of the plate 22, leg members 28 are included for supporting the fuel assembly. Unlike the present invention, no provision is made in the lower end fitting 20 for receiving a debris screen in the top portion thereof. The present invention provides a lower tie plate casting configured for receiving a debris screen in the top portion of the tie plate, with the design of the top portion including a ribbing design configured to provide a strong support for the debris screen. The ribbing is formed integral with a webbing between associated integral guide tube bosses for substantially maximizing the strength of the frame without adversely restricting flow. Bryan et al. does not show such a structure for a lower tie plate, nor does Bryan et al. teach the elimination of separate guide tube and instrument tube bushings, as provided by the present invention.

SUMMARY OF THE INVENTION

An object of the present invention is to provide an improved lower tie plate for a nuclear fuel assembly.

Another object of the invention is to provide an improved lower tie plate configured for receiving a curved blade debris screen.

Another object of the invention is to provide an improved lower tie plate fabricated from a single casting, and having integral therewith guide-tube bosses.

With these and other objects in mind, the present invention is directed towards a casting for providing a lower tie plate frame for receiving a brazed curved blade insert, forming a debris screen for blocking debris from flowing upward into the associated nuclear fuel assembly through the bottom of the tie plate. The frame or lower tie plate casting includes an integral grid pattern of strut-like arms forming a webbing for interconnecting integral guide tube bosses. The pattern for the webbing is configured for maximizing the strength of the casting, while interconnecting the guide tube bosses, all in a manner facilitating coolant flow therethrough. Also, the configuration of the integral guide tube bosses and webbing prevents tipping of the fuel assembly at times that a core plate pin is engaged therewith, when lowering the fuel assembly into position in the core. In one embodiment of the invention the integral guide tube bosses of the frame or casting are circular, whereas in another embodiment they are square. The guide tube bosses eliminate the requirement for individual guide tube inserts, as required in prior assemblies.

BRIEF DESCRIPTION OF THE DRAWINGS

Various embodiments of the present invention are described below with reference to the drawings, in which like elements are indicated by the same reference designation, wherein:

FIG. 11 is a front elevational view of a lower tie plate as provided by either of the embodiments of FIGS. 2 and 8 of the invention, with a partially broken away portion showing a portion of the debris screen of FIG.

10 mounted within the top portions thereof, respectively.

DETAILED DESCRIPTION OF THE INVENTION

Figure 1:
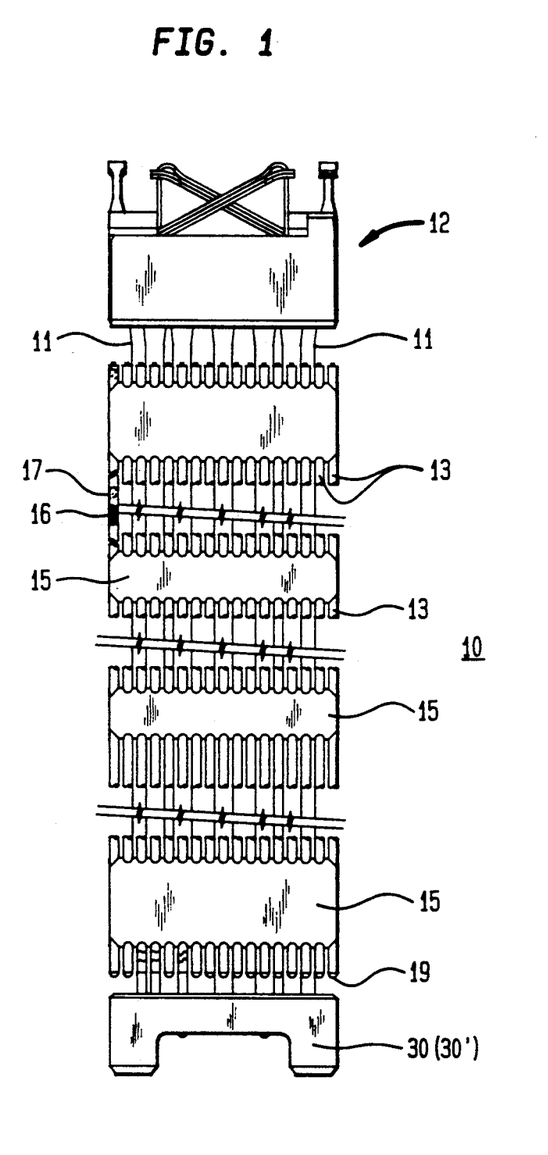
FIG. 1 shows an elevation view, partially in section, of a nuclear fuel assembly including a lower tie plate of one embodiment of the invention.

In FIG. 1, a nuclear fuel assembly 10 is shown for a Westinghouse ® (registered trademark of Westinghouse Corporation) type pressurized water reactor incorporating various embodiments of the invention as described below. Note that although the present invention, as illustrated in this example, is primarily for use in a Westinghouse ® type pressurized water reactor, the various embodiments of the invention can readily be reconfigured for use in other types of reactors.

The nuclear fuel assembly 10 includes upper and lower tie plates 12 and 30(30'), respectively, for captively retaining therebetween a plurality of fuel rods 13. Also, a plurality of guide tubes 11 are secured directly to and between the upper and lower tie plates 12 and 30(30'). A plurality of grid spacers 15, in this example, are disposed along the length of the fuel rods 13 at locations between the tie plates 12, 30(30') for providing a grid of cells through which the fuel rods 13 and guide tubes 11 extend, and are held in a desired pattern spaced apart from one another.

A stack of fuel pellets 16 is contained within each of the fuel rods 13. A spring 17 is located within each rod 13 between an upper most one of the associated pellets 16 and an upper end of the associated rod 13, for maintaining the associated fuel pellets 16 in close proximity to each other. The lower end cap 19 of each fuel rod 13 is positioned in close proximity to, but spaced away from, the upper portion of the lower tie plate 30(30') to accommodate expected linear growth of the rods 13 during normal operation of the associated reactor.

Figure 10:
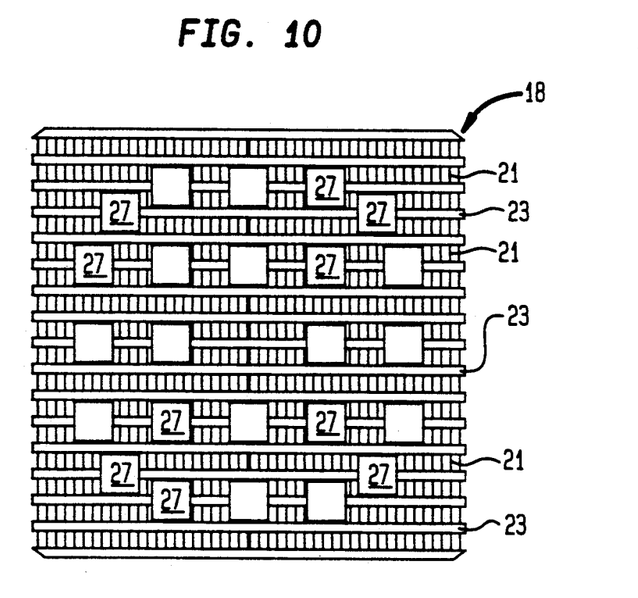
FIG. 10 is a top view of a debris screen of one embodiment of the invention.
Figure 10A:
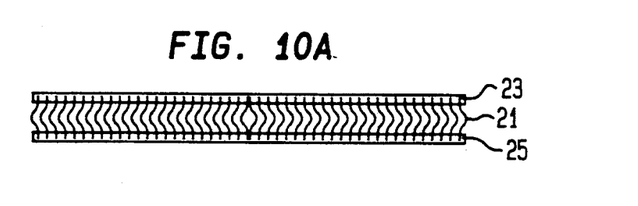
FIG. 10A is a side elevational view of the debris screen of FIG. 10.
Figure 11:
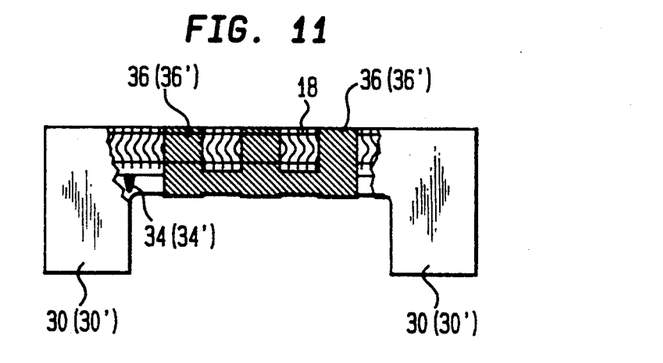

The present inventors conceived an improved design for a lower tie plate 30(30') for a nuclear fuel assembly 10 by providing substantial support to a top central area or portion of the tie plate 30(30'), that receives a brazed curved blade insert 18 (see FIGS. 10, 10A, and 11). Also, an additional improvement is derived by providing integral guide tube bosses 36 (36') for the location of guide tube cap screws (not shown). By providing the improved lower tie plate design as a unitary casting, a stiffer frame relative to known frames is provided for facilitating and brazing machining operations, in addition to reducing the number of parts required for providing the lower tie plate. Details of various embodiments of the present inventive design are provided below.

Figure 2:
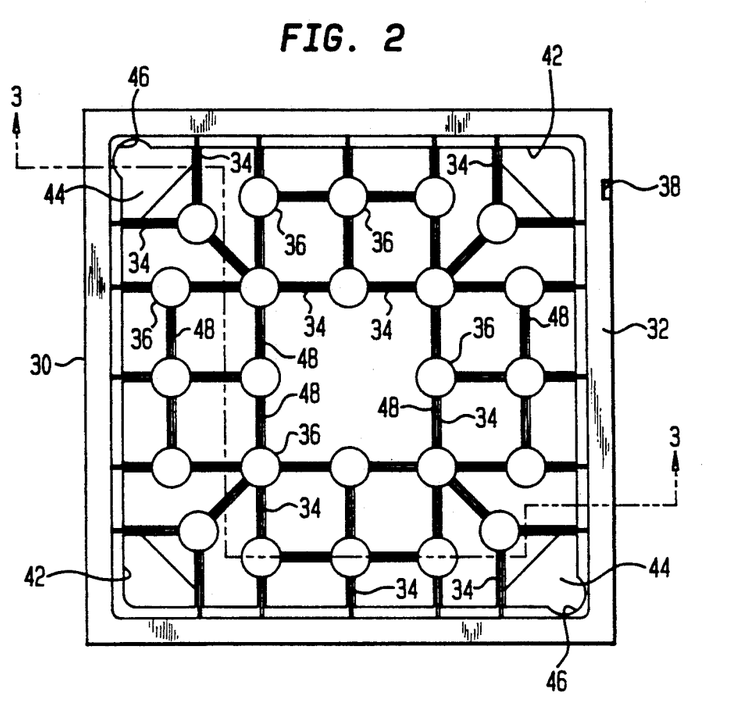
FIG. 2 is a top view of a casting providing a lower tie plate for one embodiment of the invention.

In one embodiment of the invention, a unitary casting provides the frame for a lower tie plate 30. A top view of the lower tie plate 30 is shown in FIG. 2, and includes an outer frame 32 including an integral grid or configuration of internal webbing or struts 34, structurally connecting together guide tube bosses 36. The configuration or pattern formed by the combination of the struts 34 connecting together the bosses 36 is designed to both maximize the strength of the tie plate 30, and the flow of coolant therethrough. The configuration also prevents the associated fuel assembly from tipping when a core plate pin is engaged with the webbing 34, while lowering the associated fuel assembly 10 into position in an associated reactor core. This and other embodiments of the invention are applicable for use in other configurations for providing pressurized water reactor (PWR) lower tie plate designs. Note that a locating keyway or slot 38 is provided in one side, the right-hand side of the frame 30, in this example. Substantially square cells 42 are formed in two diagonally opposing corners of lower tie plate 30. The other two diagonally opposing corners form substantially open cells 44 having semicircular exterior corner portions 46 with associated interior struts 34 being substantially perpendicular to one another, as shown. Also, each strut 34 includes a topmost centrally located longitudinal rib 48, that will be described in greater detail below.

Figure 3:
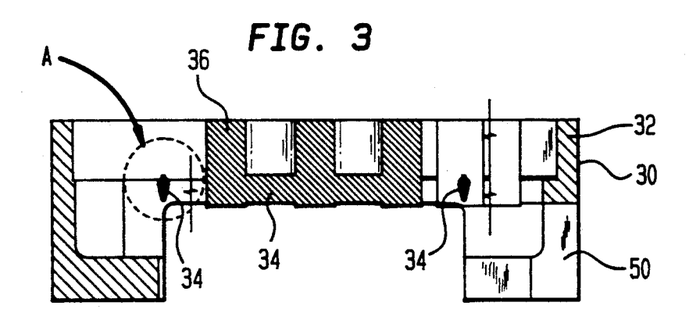
FIG. 3 is a cross-sectional view taken along section 3—3 of the embodiments of the invention of FIGS. 2 and 8, respectively.
Figure 4:
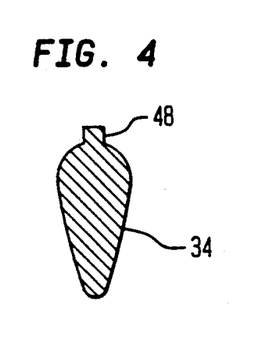
FIG. 4 is an enlarged cross-sectional view of a connecting strut in one area "A" of the cross-section of FIG. 3.

A cross-sectional view taken along 3—3 of FIG. 2 is shown in FIG. 3 for the lower tie plate 30. As shown in this example, the bosses 36 extend from the top of the frame 32 downward to a depth that is about half of the depth or height of the frame 32. Depending upon the application, the height or depth of the guide tube bosses 36 may be less than or greater than that shown for the present example. The struts or webbing 34, in this example, extend from proximate the bottom of an associated boss 36 upward to about the lower one-third bottom portion of the associated boss 36. Also, the struts or webbing 34 have a teardrop shape as shown. This shape is better shown in FIG. 4 for the enlarged view of area "A" of FIG. 3. Note that the centrally located top rib 48 has a rectangular configuration, and is formed integrally with the teardrop shaped lower portion of strut or webbing 34. As shown, the widest portion of the teardrop section of the strut 34 is at the top proximate its associated rib 48. The teardrop shaped portion of the struts 34 minimizes resistance to coolant flow. The associated ribs 48 enhance the strength of the struts 34. The ribs 48 are machined to provide a flat, even top surface for a debris screen insert to be supported by and brazed thereto into place, as described in detail below (see FIGS. 4 and 11).

Figure 5:
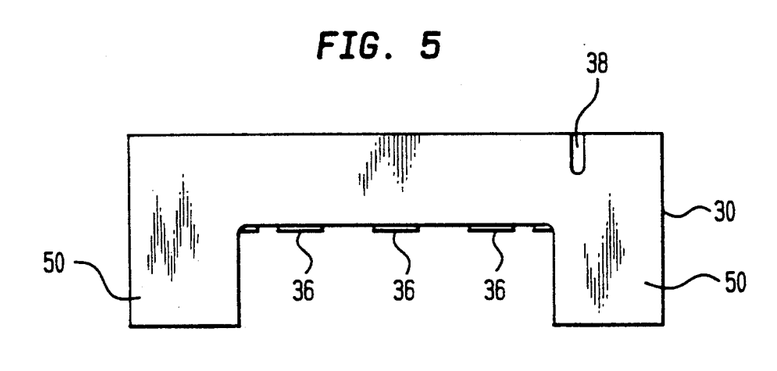
FIG. 5 is a side elevational view from the right of the embodiment of the invention of FIG. 2.
Figure 6:
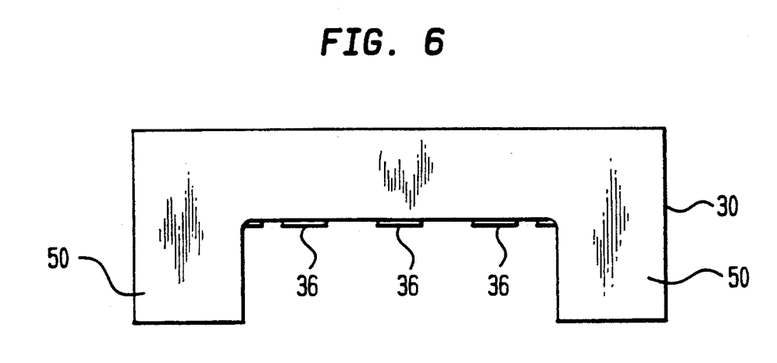
FIG. 6 is a front elevational view of the embodiment of the invention at FIG. 2, the left side and rear elevational views being identical thereto.

The right-hand side elevational view of the embodiment of FIG. 2 is shown in FIG. 5. The other three side-elevational views are substantially identical, as represented by FIG. 6. Also, the lower tie plate 30 in this embodiment includes leg portions 50, as shown in FIGS. 5 and 6. Further note that the guide tube bosses 36, in this embodiment, are circular in cross-section, thereby forming cylindrical bosses 36.

Figure 7:
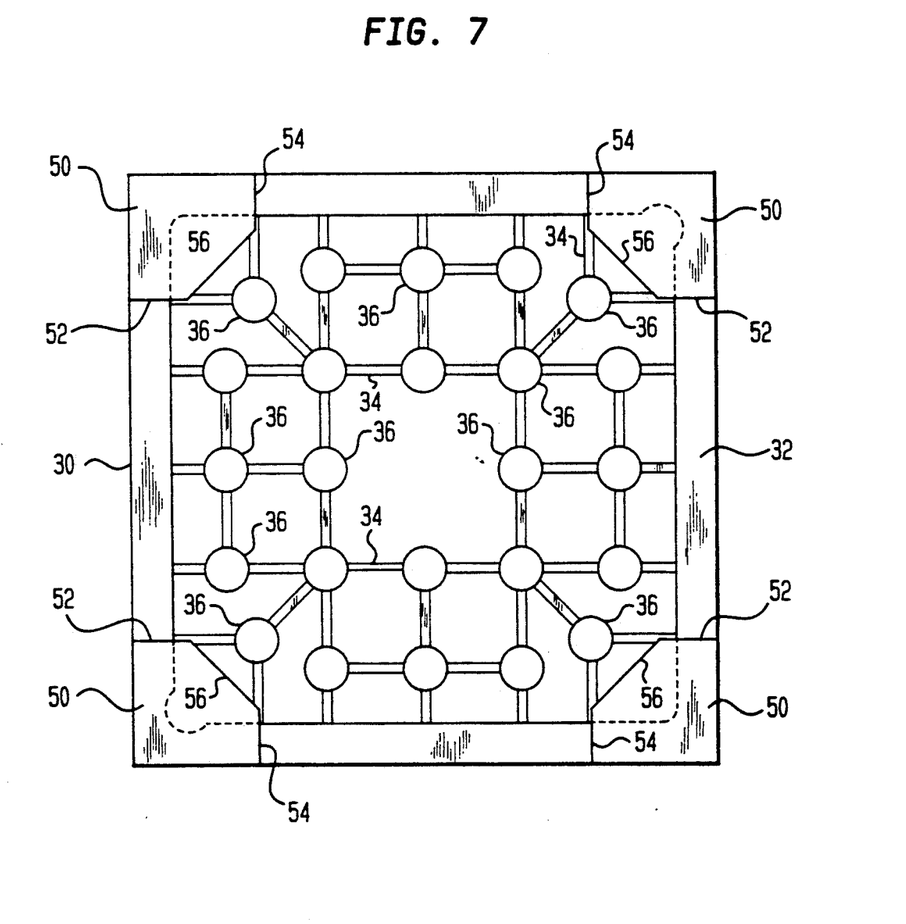
FIG. 7 is a bottom view of the embodiment of the invention of FIG. 2.

A bottom view of the lower tie plate 30 of this embodiment of the invention is shown in FIG. 7. As shown, the bottom of the legs 50 are formed in the shape of a rectangle with the two inner sides 52 and 54 being truncated for forming a diagonal fourth side 56.

With further reference to FIGS. 2 and 7, note that the guide tube bosses 36 proximate each corner of the frame 32, are each connected by two struts 34 substantially at right angles to one another to adjacent interior walls of the frame 32, with another strut 34 being connected between an associated corner boss 36 and an interiormost guide boss 36 located in one corner of a substantially square configuration of guide bosses 36 interconnected by struts 34, as shown. Note further that the guide bosses 36 located proximate the interior corners of frame 32, have their associated struts 34 in the form of a Y-configuration, as shown. The other bosses 36 have their associated struts 34 connected substantially at 90° to one another, respectively, as shown. In the embodiment shown, the guide bosses 36 are configured with eight interior guide bosses 36 connected together by struts 34 to form a square pattern, with three guide bosses 36 spaced apart on each side of the interior square pattern thus formed. Each of the interiormost bosses 36 are connected by a strut 34 to a boss 36 having its other side rigidly connected by a strut 34 to the inside wall of frame 32.

Figure 8:
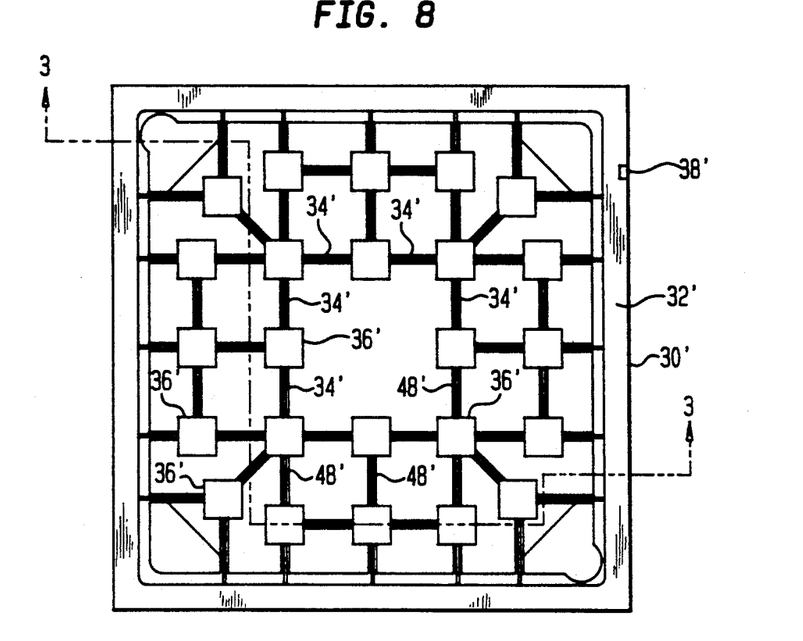
FIG. 8 is a top view of a casting for providing a lower tie plate for another embodiment of the invention.
Figure 9:
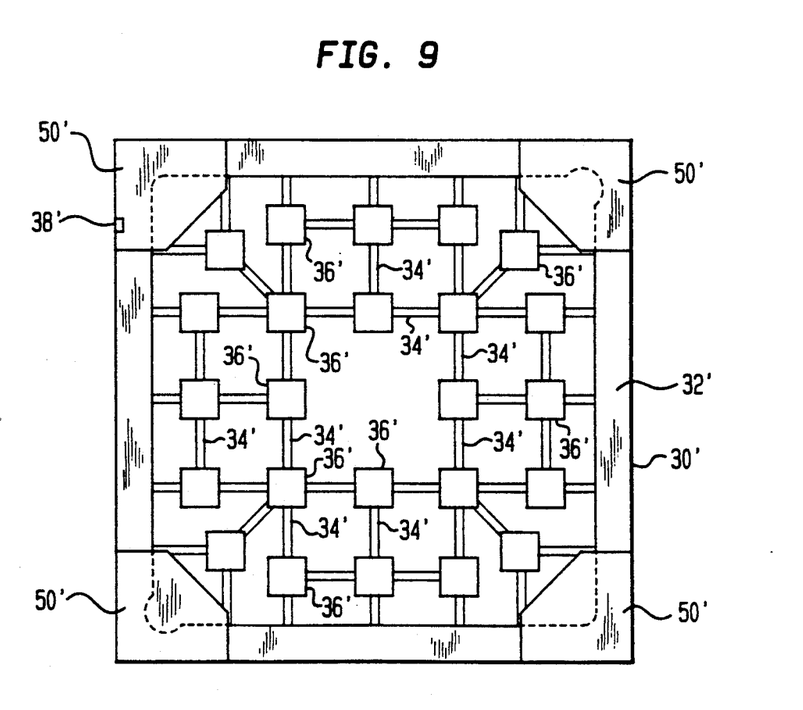
FIG. 9 is a bottom view of the embodiment of the invention of FIG. 8.

In FIG. 8, a second embodiment of the invention is shown, that differs from the embodiment of the invention of FIG. 2 in that substantially square guide tube bosses 36' are included, instead of the round guide tube bosses 36 of the first embodiment of the invention, as previously described. Otherwise, the second embodiment of the invention is substantially the same as the previously described first embodiment. FIG. 9 shows a bottom view of the second embodiment of the invention. Note that all reference designations for the second embodiment of the invention are primed relative to reference designations for the first embodiment of the invention, and other than the substantially square guide tube bosses 36', the other elements of the second embodiment of the invention are substantially the same as those of the first embodiment.

In FIGS. 10 and 10A, a debris screen 18 is configured for use in conjunction with the second embodiment of the invention, as described above. This debris screen 18 has certain similarities to the debris screen shown in FIG. 7 of Yates et al. U.S. Pat. No. 5,030,412, having the same assignee as the present invention, the teachings of which are incorporated herein by reference. The debris screen 18 includes a plurality of upper and lower tie bars 23 and 25, respectively. Tie bars 23 and 25 are spaced so as to intercept any fuel rods 13 that might drop down in the fuel assembly 10. Note that an array of regularly spaced, substantially parallel curved or bowed plates or blades 21 are included in the interior portions of the debris screen 18 for trapping debris flowing upward through the associated lower tie plate 30', in this example. In FIG. 11, the debris screen 18 is shown mounted within the top portion of one of the present lower tie plates 30 or 30'. In this regard, note that the configuration of the bottom portion of the lower tie plate 30, as shown in FIG. 7 for the first embodiment of the invention, and of the lower tie plate 30' as shown in FIG. 9 for the second embodiment of the invention, is adapted to permit the debris screen 18 to fit snugly therein. As shown, debris screen 18 is square and includes a plurality of square holes 27 in one grid thereof configured for fitting over premachined bushings 36' (see FIG. 8), in this example.

With further reference to FIG. 10, by making holes 27 round, instead of square as shown, debris screen 18 is reconfigured for use in conjunction with the first embodiment of the invention. The round holes would correspondingly fit over the premachined bushings 36 shown in FIG. 2, for the first embodiment of the invention.

Note that the debris screen 18 of FIG. 10 is shown for purposes of illustration, for providing an example of a debris screen useful in various embodiments of the invention. However, many other debris screen configurations may be used in combination with the various embodiments of the invention, which is not meant to be limited to that of FIG. 10.

As previously mentioned, the present lower tie plates 30 and 30' are provided by integral castings, respectively. The preferred material for the castings is low carbon 304 stainless steel (CF-3). Other equivalent materials may be substituted therefor.

Although various embodiments of the present invention have been shown and described herein, they are not meant to be limiting. Modifications to these embodiments may occur to those of skill in the art, which modifications are meant to be covered by the spirit and scope of the appended claims. For example, the guide tube bosses can be other than circular or square shaped, depending upon the application.

What is claimed is:

1. A lower tie plate for a nuclear fuel assembly, said lower tie plate being adapted for retaining in a top portion a debris screen through which coolant flows, comprising:
   an outer frame-like member including a top portion, a bottom portion, and side portions;
   a first plurality of guide tube bosses spaced apart within a centralmost portion of said frame member;
   a second plurality of guide tube bosses spaced apart within said frame in a configuration concentric with the configuration of said first plurality of guide tube bosses;
   a plurality of struts for rigidly connecting said first and second plurality of guide tube bosses to one-another and to said frame in a desired configuration providing a plurality of open cells;
   said first and second plurality of guide tube bosses serving to directly receive guide tube cap screws of a plurality of guide tubes of said nuclear fuel assembly, respectively, for retaining said guide tubes; and
   the top portion of the combination of said frame, first and second plurality of guide tube bosses, and plurality of struts being configured for receiving and providing a support structure for said debris screen.

2. The lower tie plate of claim 1, wherein said first and second plurality of guide tube bosses, said plurality of struts, and said frame, are formed from a unitary integral casting.

3. The lower tie plate of claim 1, wherein said plurality of struts have a substantially teardrop shaped cross-section, respectively, for minimizing resistance to coolant flow.

4. The lower tie plate of claim 3, wherein said plurality of struts each have a maximum width that is substantially less than the width of said first and second plurality of guide tube bosses, respectively.

5. The lower tie plate of claim 4, wherein said plurality of struts each have a narrow longitudinal strengthening rib along the central portion of their topmost surface, respectively.

6. The lower tie plate of claim 3, wherein said plurality of struts are oriented to position their respective minimum width portions thereof proximate the bottom of said lower tie plate.

7. The lower tie plate of claim 2, wherein said casting consists of low carbon stainless steel.

8. The lower tie plate of claim 2, wherein said casting consists of low carbon 304 stainless steel.

9. The lower tie plate of claim 1, wherein said frame has a substantially square configuration, and includes four feet located at the corners of said frame, respectively.

10. The lower tie plate of claim 1, wherein said first and second plurality of guide tube bosses have a circular shape, respectively.

11. The lower tie plate of claim 1, wherein said first and second plurality of guide tube bosses have a substantially square shape, respectively.

12. The lower tie plate of claim 2, further including a locating slot or keyway in an upper portion of a side of said frame member.

13. A lower tie plate for a nuclear fuel assembly comprising:
   an outer frame including top, bottom, and side portions;
   a first plurality and a second plurality of guide tube bosses located concentric to one another within said frame, said first plurality of guide tube bosses being arranged about the circumference of a centralmost hole through said tie plate, said first and second plurality of guide tube bosses being adapted for directly receiving guide tube cap screws of a plurality of guide tubes of said nuclear fuel assembly, respectively; and
   a plurality of teardrop shaped struts for rigidly connecting said first and second pluralities of guide tube bosses to one-another and to said frame, respectively, in a configuration providing open cells therebetween.

14. The lower tie plate of claim 13, wherein the top portion of the combination of said frame, said first and second plurality of guide tube bosses, and plurality of struts are configured to provide means for receiving and providing a support structure for a debris screen.

15. The lower tie plate of claim 13, wherein said outer frame, first and second plurality of guide tube bosses, and plurality of struts are formed from a unitary integral casting.

16. The lower tie plate of claim 15, wherein said casting consists of low carbon stainless steel.

17. The lower tie plate of claim 13, wherein said first and second plurality of guide tube bosses have a circular cross sectional area.

18. The lower tie plate of claim 13, wherein said first and second plurality of guide tube bosses have a square cross-sectional area.

19. The lower tie plate of claim 13, wherein said plurality of teardrop shaped struts each are oriented with their minimum widths directed toward the bottom of said lower tie plate.

20. The lower tie plate of claim 19, wherein said plurality of struts each have a narrow longitudinal strengthening rib along their central top portion, respectively.

21. The lower tie plate of claim 1, further including said first and second pluralities of guide tube bosses extending upward through correspondingly located holes in an associated said debris screen.

22. The lower tie plate of claim 13, further including said first and second pluralities of guide tube bosses extending upward through correspondingly located holes in an associated said debris screen.

* * * * *